United States Patent
Schubert

(10) Patent No.: US 7,370,626 B2
(45) Date of Patent: May 13, 2008

(54) HIGH COMPRESSION SPARK-IGNITION ENGINE WITH THROTTLE CONTROL, EXTERNALLY SUPPLIED IGNITION, AND DIRECT FUEL INJECTION INTO A PRECOMBUSTION CHAMBER

(76) Inventor: Gottfried Schubert, Dorfstrasse 25, Schwabering (DE) 83139

( * ) Notice: Subject to any disclaimer, the term of this patent is extended or adjusted under 35 U.S.C. 154(b) by 0 days.

(21) Appl. No.: 11/568,978

(22) PCT Filed: May 10, 2005

(86) PCT No.: PCT/EP2005/052106

§ 371 (c)(1),
(2), (4) Date: Dec. 31, 2006

(87) PCT Pub. No.: WO2005/111393

PCT Pub. Date: Nov. 24, 2005

(65) Prior Publication Data

US 2008/0017165 A1    Jan. 24, 2008

(30) Foreign Application Priority Data

May 12, 2004    (DE) ............... 10 2004 023 409

(51) Int. Cl.
*F02B 19/12* (2006.01)
(52) U.S. Cl. ............... 123/275; 123/209; 123/268; 123/284; 123/299
(58) Field of Classification Search ............... 123/209, 123/260, 261, 268, 275, 284, 299
See application file for complete search history.

(56) References Cited

U.S. PATENT DOCUMENTS

| 3,945,365 | A | * | 3/1976 | Regueiro ............ 123/265 |
|---|---|---|---|---|
| 4,038,952 | A | * | 8/1977 | Nagano ............ 123/259 |
| 4,108,136 | A | * | 8/1978 | Hideg et al. ............ 123/209 |
| 4,250,852 | A | | 2/1981 | Abulkasim Ogly Kerimov et al. |
| 4,372,264 | A | | 2/1983 | Trucco |
| 4,444,166 | A | * | 4/1984 | Kovacs et al. ............ 123/262 |
| 4,467,759 | A | | 8/1984 | Artman |
| 5,603,298 | A | | 2/1997 | Kawamura |
| 6,343,585 | B1 | | 2/2002 | Fujieda et al. |

FOREIGN PATENT DOCUMENTS

DE    1037756    8/1958

* cited by examiner

*Primary Examiner*—Erick Solis
(74) *Attorney, Agent, or Firm*—Themis Intellectual Property Counsel

(57) ABSTRACT

The invention relates to a spark-ignition engine with a highly structural compression ratio greater than 15:1, throttle regulation, externally supplied ignition and with direct fuel injection into a precombustion chamber, which is connected to the main combustion chamber via an overflow channel. The fuel is injected into the precombustion chamber during the compression stroke and is ignited by a spark plug located in a manner that is as central as possible. The invention relates to a spark-ignition engine with a highly structural compression ratio greater than 15:1, throttle regulation, externally supplied ignition and with direct fuel injection into a precombustion chamber, which is connected to the main combustion chamber via an overflow channel. The fuel is injected into the precombustion chamber during the compression stroke and is ignited by a spark plug located in a manner that is as central as possible.

12 Claims, 2 Drawing Sheets

HIGH COMPRESSION SPARK-IGNITION ENGINE WITH THROTTLE CONTROL, EXTERNALLY SUPPLIED IGNITION, AND DIRECT FUEL INJECTION INTO A PRECOMBUSTION CHAMBER

FIELD OF THE INVENTION

The present invention relates to a spark-ignition engine having a structural compression ratio $\epsilon$ greater than 15:1, throttle control, externally supplied ignition, and direct fuel injection into a precombustion chamber, which is connected via an overflow conduit to the main combustion chamber.

BACKGROUND OF THE INVENTION

Spark-ignition engines being built and offered at present have a relatively low compression as compared with a diesel engine, and therefore have a higher fuel consumption especially in the part-load range. The diesel engine, on the other hand, requires a relatively stronger and heavier construction because of its high peak pressure, generally runs louder and more roughly, and generates more nitrogen oxides but, especially, more health-endangering soot particles.

The higher part-load fuel consumption of the spark-ignition engine has an effect principally in part-load operation, which is very negative for everyday operation since our automobiles, because of heavy road traffic, can now be operated almost only in the part-load range.

A variety of improvements have been introduced for lowering the fuel consumption of the spark-ignition engine: improving combustion by way of swirl and turbulence in the fuel-air mixture, mixture leaning, charge stratification, multiple sparking, and others. In the case of the diesel engine, improvements have been sought by way of direct fuel injection into precombustion chambers and secondary combustion chambers, a directed injection stream, and much more. All the improvements in the prior art have not, however, yielded any substantial decrease in fuel consumption, especially in the spark-ignition engine.

In order to appreciably lower fuel consumption in the spark-ignition engine, especially in the part-load range, the compression ratio must be effectively raised, so that thermal efficiency can increase appreciably. Present-day spark-ignition engines operate, as is known, with structural compression ratios of approx. $\epsilon$=10:1. If this value is substantially exceeded, the risk then exists, during full-load operation, of spontaneous ignition with "pinging" or even "knocking" combustion, which, as is known, can result in a drastic drop in torque and power and possibly in destruction of the combustion engine. Diesel engines operate with structural compression ratios of $\epsilon$=18 to 25:1, including in the part-load range, since the diesel engine, in contrast to the Otto-cycle engine, must compress almost the entire cylinder charge in every load condition, in order to achieve the necessary self-ignition temperature. The diesel engine therefore operates, particularly in the part-load range, with a substantially higher thermal efficiency than the spark-ignition engine, which, because of its throttle control system, compresses only a partial charge in each case and thus sometimes operates at very low effective compression ratios of less than $\epsilon$=3:1. At idle, for example, a spark-ignition engine has only an approx. 20 to 25 percent charge.

A disadvantage of the diesel engine, however, is that because of the high compression of almost the entire cylinder charge, the engine must also perform a great deal of compression work. It is therefore known in the art that a spark-ignition engine that could operate in the part-load range with high compression ratios similar to those of a diesel engine would be superior to the latter because of the lower compression required.

SUMMARY OF THE INVENTION

A spark-ignition engine having a structural compression ratio greater than 15:1, throttle control, externally supplied ignition, and direct fuel injection into a precombustion chamber, which that is connected via an overflow conduit to the main combustion chamber, fuel being injected into the precombustion chamber during the compression stroke and ignited by a spark plug arranged therein as centrally as possible.

BRIEF DESCRIPTION OF THE SEVERAL VIEWS OF THE DRAWINGS

Exemplifying embodiments of the invention are depicted in the drawings, in which.

The numbers that are present refer to the same parts in all the Figures, specifically.

Figure 1:
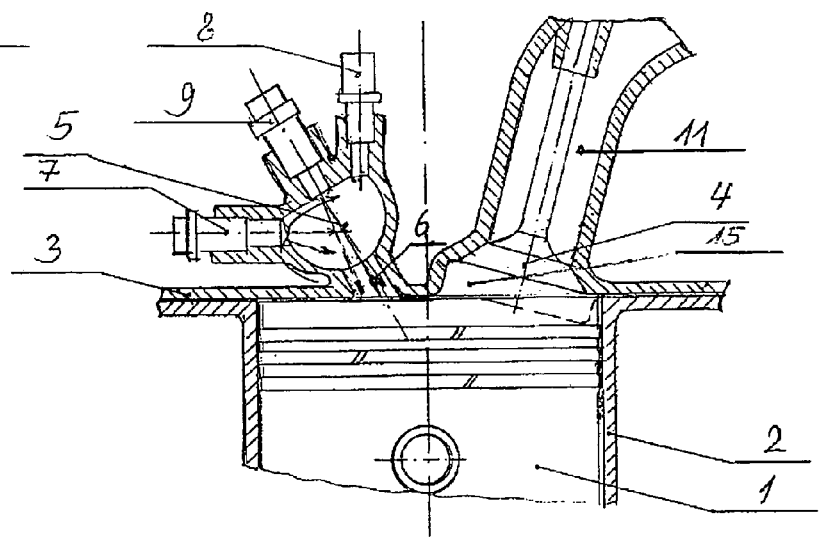
FIG. 1 shows a cylinder of a reciprocating engine according to the present invention.
Figure 2:
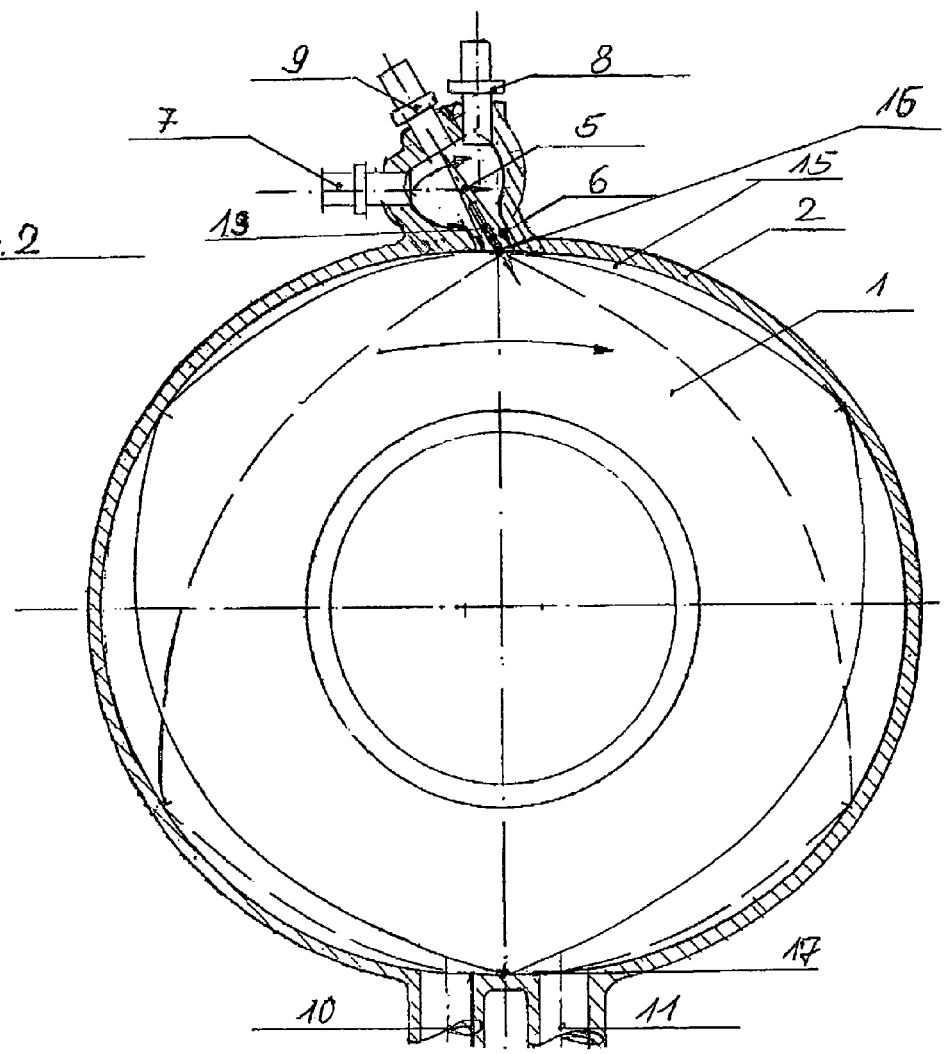
FIG. 2 shows a rotary engine according to the present invention.
Figure 3:
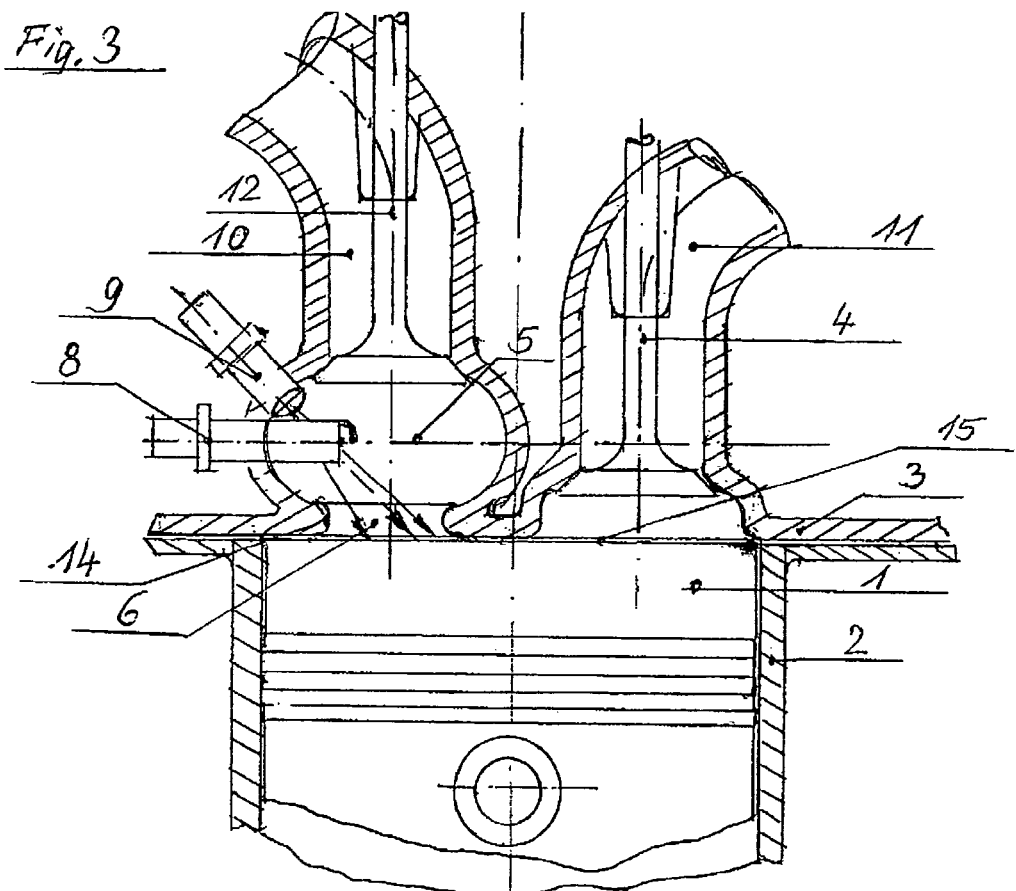
FIGS. 3 and 4 show a cylinder of a reciprocating engine according to Claim 7 in elevation and in plan, in which the precombustion chamber is arranged between the intake valve and main combustion chamber.
Figure 4:
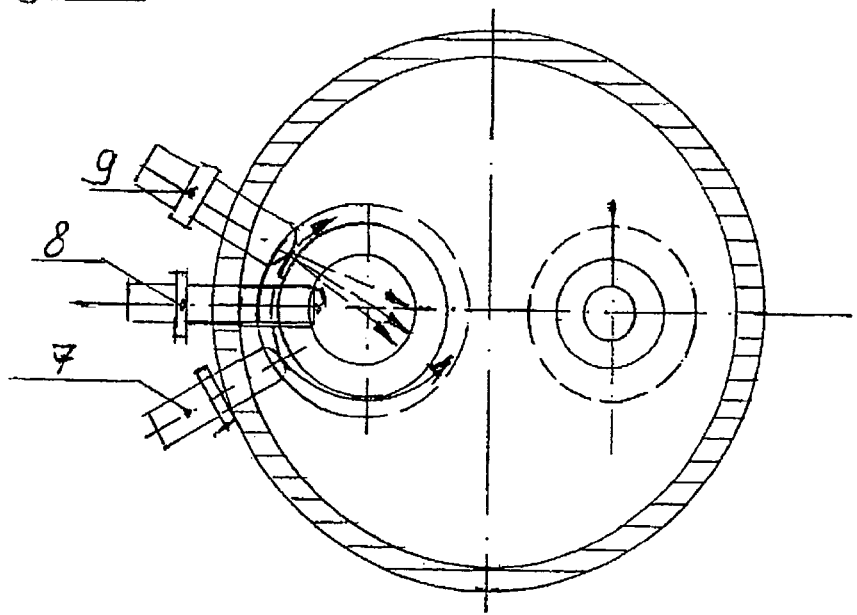

1 Piston
2 Cylinder wall or trochoid
3 Cylinder head
4 Exhaust valve
5 Precombustion chamber
6 Overflow conduit
7 Main injection nozzle
8 Spark plug
9 Second injection nozzle
10 Intake duct
11 Exhaust duct
12 Intake valve
13 Partition in overflow conduit of a rotary engine
14 Peripheral ridge
15 Main combustion chamber
16 Ignition TDC
17 Overlap TDC in rotary engine

DETAILED DESCRIPTION OF EMBODIMENTS OF THE INVENTION

The compression method according to the present invention for spark-ignition engines, as described below, is intended to combine the advantages of the Otto-cycle combustion method with those of the diesel engine (high compression) but still control the risk of spontaneous ignition. The spark-ignition engine according to the present invention is includes a structural compression ratio of $\epsilon$=15 to 25:1, and thus achieves a correspondingly low fuel consumption in the part-load range. With reference to the figures, a spark ignition engine contains a piston 1, an exhaust valve 4, and intake duct 10 and exhaust duct 11. The spark-ignition engine according to the present invention has, outside the main combustion chamber 15 (i.e. the space between the crown of piston 1 and cylinder head 3 in the reciprocating engine), a precombustion chamber 5 arranged in the cylinder head 3 and connected via an overflow conduit 6 to the main combustion chamber 15, into which precombustion chamber 5 fuel is directly injected during the compression stroke and is ignited by a spark plug 8 arranged in said precombustion chamber 5. This precombustion chamber 5 is as compact as possible (spherical or semispherical) so that the combustion path and burn time become as short as possible; for the same reason, the spark plug 8 is to be arranged as centrally as possible. Because this precombustion chamber 5 becomes relatively hot during operation despite an elevated degree of cooling, the injected fuel stream is intended to cool the precombustion chamber 5 as it slides along the inner wall of the chamber and thereby evaporates the fuel, which is then ignited at the optimum instant relatively close to top dead center (TDC) 16. Because of the short combustion paths, combustion proceeds very rapidly, which results in largely complete combustion with high thermal efficiency. In this embodiment, the spark-ignition engine can be operated only as a throttled engine; to achieve this, the opening of the throttle valve must be limited sufficiently, so that spontaneous ignition cannot yet occur. High peak values for torque and power are thereby initially sacrificed, but what is received in exchange is a very economical throttled engine that is entirely equivalent in power and torque to the original engine having a compression ratio of $\epsilon=10:1$, since the spark-ignition engine operates with a much higher compression ratio.

In order to enable true full-load operation in the context of the spark-ignition engine according to the present invention, the following injection control system is provided: Beginning already in the higher part-load range, i.e. when the risk of spontaneous ignition may exist, only a portion (approx. two-thirds) of the fuel required for complete combustion is injected into the precombustion chamber 5, with the result that the fuel-air (gasoline-air) mixture thereby obtained is initially not ignitable. It is known that when gasoline is used as a fuel, a fuel-air mixture is ignitable at all only at relatively narrowly defined mixing ratios, specifically in the range of approximately $\lambda=0.5$ to 1.2, where $\lambda=1.0$ corresponds to the stoichiometric air-fuel ratio. In order to make the fuel-air mixture premixed in the precombustion chamber 5, the remainder of the fuel required (approx. one-third) is post-injected shortly before the optimum ignition instant known from the part-load range, and ignitability is thereby achieved. This post-injection can be made from the same injection nozzle. It can, however, also be made from a second injection nozzle 9, in such a way that the second fuel stream proceeds in the direction of the axis of the overflow-conduit 6 and the flame is thus carried better into the main combustion chamber 15. Actual combustion in the precombustion chamber 5 proceeds so quickly that it is almost impossible for "knocking" combustion to occur there, especially since the pressure wave proceeding from ignition can initially expand via the overflow conduit; spontaneous ignition cannot occur in the main combustion chamber 15 because only compressed air without fuel is present therein.

True full-load operation of the spark-ignition engine according to the present invention can thus also be controlled. A spark-ignition engine of this kind will nevertheless achieve relatively high torque and power values because of its high compression ratio, and therefore require mechanical reinforcement.

In the embodiment just described, the spark-ignition engine according to the present invention is a high-performance engine with very low part-load consumption. The residual air in the main combustion chamber acts like a post-combustion system, with the result that a separate catalytic converter should be superfluous.

In order to extract the very last reserves of power from the spark-ignition engine according to the present invention, the residual air still present in the main combustion chamber 15 can be provided with an injection of fuel and ignited by a second spark plug. A separate catalytic converter is then needed once again, in order to achieve adequate emissions values.

In order to make combustion in the spark-ignition engine according to the present invention even more effective, the precombustion chamber can be cleared of residual exhaust gas, and filled with fresh air, by blowing air into the precombustion chamber toward the end of the exhaust stroke.

A relatively simple variant of the spark-ignition engine according to the present invention could be configured so that the precombustion chamber is arranged between an intake valve 12 and the main combustion chamber 15, and separated from the latter by a peripheral ridge 15 to the extent that uncombusted fuel does not get into the main combustion chamber. In this version, the precombustion chamber 5 is automatically flushed and filled with fresh air during the intake stroke.

The Wankel rotary piston engine is particularly suitable for the combustion method according to the present invention described above, since it is known to require only one combustion chamber for three pistons in one disk. This rotary piston engine was previously known for its elevated fuel consumption, poor running characteristics (two-stroking in the lower part-load range), and greatly excessive exhaust temperatures. All these disadvantages are overcome by the combustion method according to the present invention: the compact precombustion chamber 5, which in this case is located outside the so-called trochoid 2 and is connected via the overflow conduit 6 to the main combustion chamber 5, substantially improves combustion; and fuel losses via so-called leakage gases are eliminated because uncombusted fuel does not get into the main combustion chamber 15. The leakage gases contain only air or already-combusted exhaust gases. The previously necessary combustion recesses in the piston surfaces are also eliminated because of the precombustion chamber 5; this eliminates the short-circuit losses that were previously common, even with the more favorable peripheral intake and exhaust, at so-called overlap TDC 17. The overflow conduit 6 terminates at the trochoid 2 in the region of ignition TDC 16 or later in the rotation direction, in order to flush the precombustion chamber 5 better; this is further improved if the overflow conduit 6 contains a partition extending in the axis of overflow-conduit 6 and arranged transversely to the rotation direction. The reason is that the overpressure in the lagging piston combustion chamber then firstly pushes air into the precombustion chamber 5, forces the exhaust gas into the leading piston combustion chamber, and only then fills the precombustion chamber 5 with fresh air during the further compression stroke. Here as well, flushing could be improved by a separate inflow of fresh air. All these actions result in orderly gas exchange and thus smooth engine running, lower fuel consumption, and normal exhaust temperatures.

The invention claimed is:

1. A spark-ignition engine comprising:
a compression ratio $\epsilon$ greater than 15:1;
a throttle control;
an externally supplied ignition; and a direct fuel injection into a precombustion chamber connected via an overflow conduit to a main combustion chamber, wherein fuel is injected into the precombustion chamber during a compression stroke and is ignited by a spark plug arranged therein in a substantially central position.

2. The spark-ignition engine according to claim 1, wherein is the spark ignition engine is configured to be throttled to prevent an uncontrolled spontaneous ignition.

3. The spark-ignition engine according to claim 1, wherein the direct fuel injection causes an injected fuel stream to be guided along an inner side of the precombustion chamber at a right angle in relation to a longitudinal axis of the overflow conduit.

4. The spark-ignition engine according to claim 1, wherein the spark-ignition engine is configured to initially inject in the precombustion chamber a first portion of the fuel required for complete combustion, and to later inject a second portion of the fuel prior to fuel ignition.

5. The spark-ignition engine according to claim 4, wherein the first portion of the injected fuel is injected from a first injection nozzle, wherein the second portion of the injected fuel is injected from a second injection nozzle, and wherein a stream of the fuel from the second injection nozzle proceeds in the axial direction of the overflow conduit.

6. The spark-ignition engine according to claim 1, wherein the spark-ignition engine is configured to introduce fresh air into the precombustion chamber toward the end of an exhaust stroke.

7. The spark-ignition engine according to claim 1, wherein the precombustion chamber is disposed between an intake valve and the main combustion chamber, and wherein the precombustion chamber is partly separated from the main combustion chamber by a peripheral ridge.

8. The spark-ignition engine according to claim 1, wherein the spark-ignition engine is configured as a rotary engine having a piston with no combustion recess, wherein the precombustion chamber is arranged outside a trochoid and is connected via the overflow conduit to the main combustion chamber, and wherein the overflow conduit terminates at the trochoid in the region of an ignition top dead center or at a later point in a rotation direction.

9. The spark-ignition engine according to claim 1, wherein the spark-ignition engine is configured to inject an additional quantity of fuel into the main combustion chamber, and wherein the additional quantity of fuel is ignited there by a second spark plug.

10. The spark-ignition engine according to claim 8, wherein a partition extends in the direction of a longitudinal axis of the overflow conduit and is arranged transversely to the rotation direction, and wherein the partition is located in the overflow conduit of the rotary engine.

11. The spark-ignition engine according to claim 3, wherein the injected fuel stream is caused to contact a wall on the inner side of the precombustion chamber, thereby causing a cooling of the wall.

12. The spark-ignition engine according to claim 4, wherein the first portion contains approximately twice the amount of fuel than the second portion.

* * * * *